Patented May 12, 1931

1,804,503

UNITED STATES PATENT OFFICE

JOHN HALL GARDNER, OF COLLEGE PARK, MARYLAND

NITROCELLULOSE COMPOSITION

No Drawing. Application filed October 15, 1925. Serial No. 62,651.

My invention aims to provide a composition of matter comprising nitrocellulose and a new solvent or class of solvents therefor. Its further purposes will appear from the following description.

I have found desirable, from the standpoints of economy of production and merit of the final product, the use of aryloxy alkyl esters of the fatty acids, such as phenoxy ethyl acetate, having the formula

To make a solvent of my new type I proceed from raw materials which are now available. In one preparation, for example, 47 parts by weight of phenol were dissolved in a solution of 30 parts of sodium hydroxide in 200 parts of water. To this mixture, under a reflux condenser, was added, dropwise, 50 parts of ethylene chlorhydrin. Turbidity developed and soon an oily layer formed. After half an hour's boiling, the oily layer was separated and washed, first, with a solution of sodium hydroxide and, finally, with water. The washed oil was then dried by means of anhydrous sodium sulfate. Distillation gave phenoxy ethyl alcohol, $C_6H_5O.CH_2.CH_2OH$, boiling at 240–5° C., under atmospheric pressure.

This aryloxy alcohol was then esterified with acetic acid in the presence of hydrogen chloride. The ester was washed, dried, and distilled.

I have discovered that phenoxy ethyl acetate, either alone or mixed with other solvents or diluents, is an excellent colloiding agent or solvent for nitrocellulose. I make use of this discovery in the production of compositions of nitrocellulose and phenoxy ethyl acetate suitable for use in the manufacture of plastics, films, lacquers or other solutions of nitrocellulose.

A pyroxylin lacquer, for example, may be prepared of the following composition: Nitrocellulose (containing about 12% by weight of nitrogen), 8 oz.; phenoxy ethyl acetate, 2 oz.; and one gallon of volatile organic liquids which may well consist of ethyl acetate 20% by volume, ethyl alcohol 10%, butyl acetate 40%, and benzene 30%. Resins, stabilizers, pigments, and plasticizers may or may not be used, the choice depending on the purpose for which the lacquer is intended.

The proportions of the above ingredients may be varied over a wide range without departing from the spirit of my invention. The use of a higher proportion of the phenoxy ethyl acetate increases the softness of the film remaining after the evaporation of the usual, more readily volatile liquids. Phenoxy ethyl acetate itself is substantially non-volatile at ordinary temperatures. Conversely, the use of a smaller proportion of phenoxy ethyl acetate favors the production of a hard residual film.

Phenoxy ethyl acetate has some advantages over camphor in the production of plastics of the type of celluloid. This new solvent, being a liquid, may be incorporated with nitrocellulose with a smaller proportion of low-boiling liquid than when there is used camphor, a solid at all temperatures at which nitrocellulose products and plastics can be fabricated.

Various aryloxy groups may be substituted for the phenoxy group used in the illustrations above. Thus naphthoxy ethyl acetate I have found to be a good solvent; this however, is a solid at ordinary temperatures and has, to a degree, the same disadvantage as camphor in that respect. Further, any alkyl group may be substituted for the ethyl group.

Also, I may use any fatty acid for the purpose served by acetic acid in the illustrative examples. The class of compounds whose use as solvents is comprehended in my invention is represented by the type formula

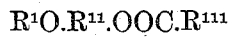

in which $R^1$ represents a univalent aromatic radical composed of carbon and hydrogen, such as $C_6H_5$, $CH_3.C_6H_4$, or $C_1OH_7$ (naphthyl), their homologs, isomers, or derivatives formed by substitution of hydrogen by halogen, nitro, or other groups; $R^{11}$ represents an alkylene group or a substitution product thereof such as ethylene, butylene, or a polymethylene group, and $R^{111}$ represents hydrogen or an alkyl group or a substitution product thereof.

My new solvent may be defined as any ester of an aryloxy aliphatic alcohol. An aryloxy aliphatic alcohol is an ether of a glycol, such as ethylene glycol, propylene glycol, or a polymethylene glycol, with one molecule of a phenol, such as phenol, alpha or beta naphthol, cresol, or their homologs, isomers, or substitution products.

I claim:

1. A composition of matter comprising nitrocellulose and a phenoxy alkyl ester of acetic acid.

2. A composition of matter comprising nitrocellulose and phenoxy ethyl acetate.

3. A lacquer comprising nitrocellulose, volatile solvents, and phenoxy ethyl acetate.

In testimony that I claim the foregoing as my own, I have hereto affixed my signature.

JOHN HALL GARDNER.